March 21, 1944.  H. M. SLOAT  2,344,650
LOADING APPARATUS
Filed Nov. 5, 1942   2 Sheets-Sheet 1
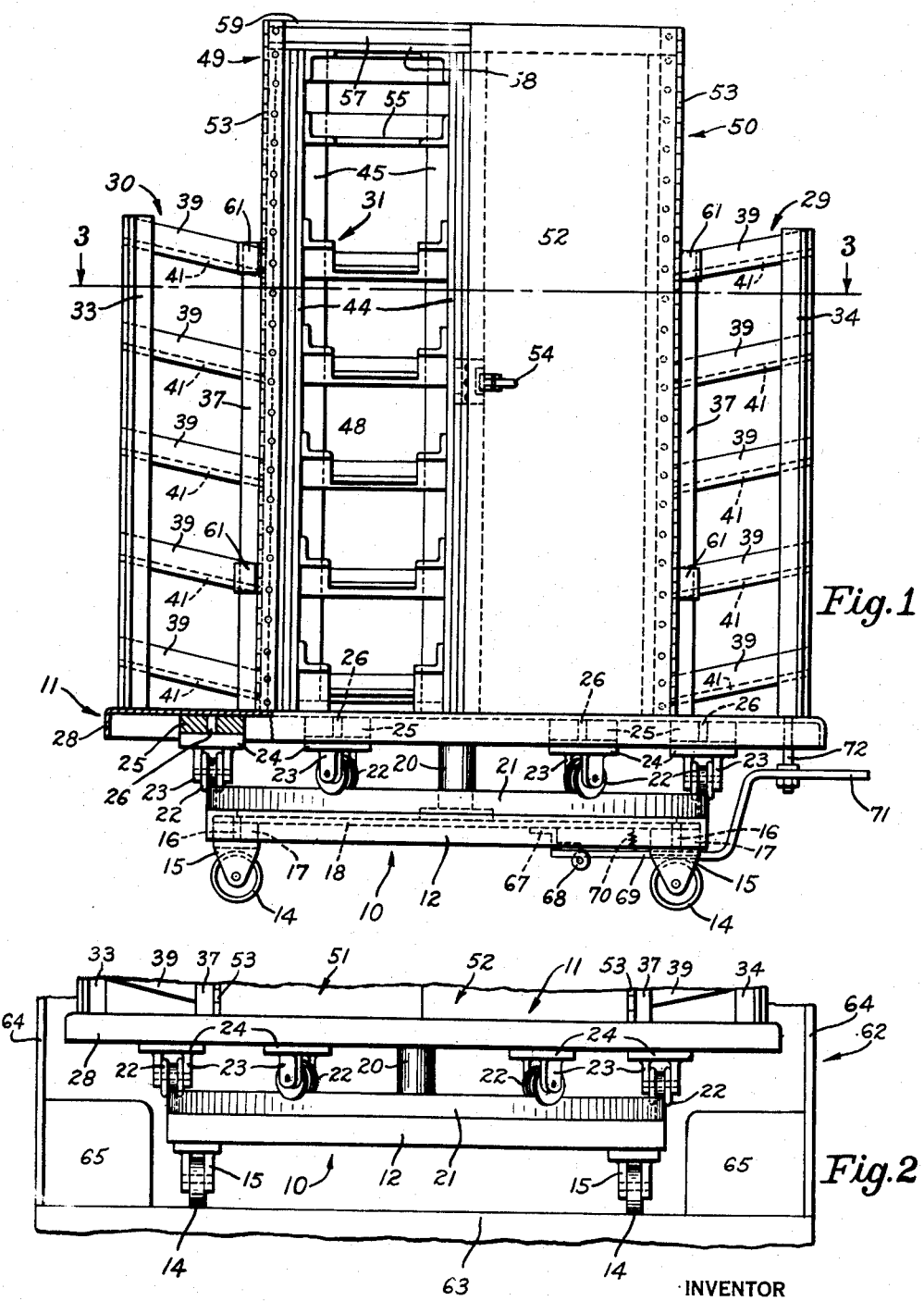
INVENTOR
Howard M. Sloat
BY
ATTORNEY March 21, 1944.     H. M. SLOAT     2,344,650
LOADING APPARATUS
Filed Nov. 5, 1942     2 Sheets-Sheet 2
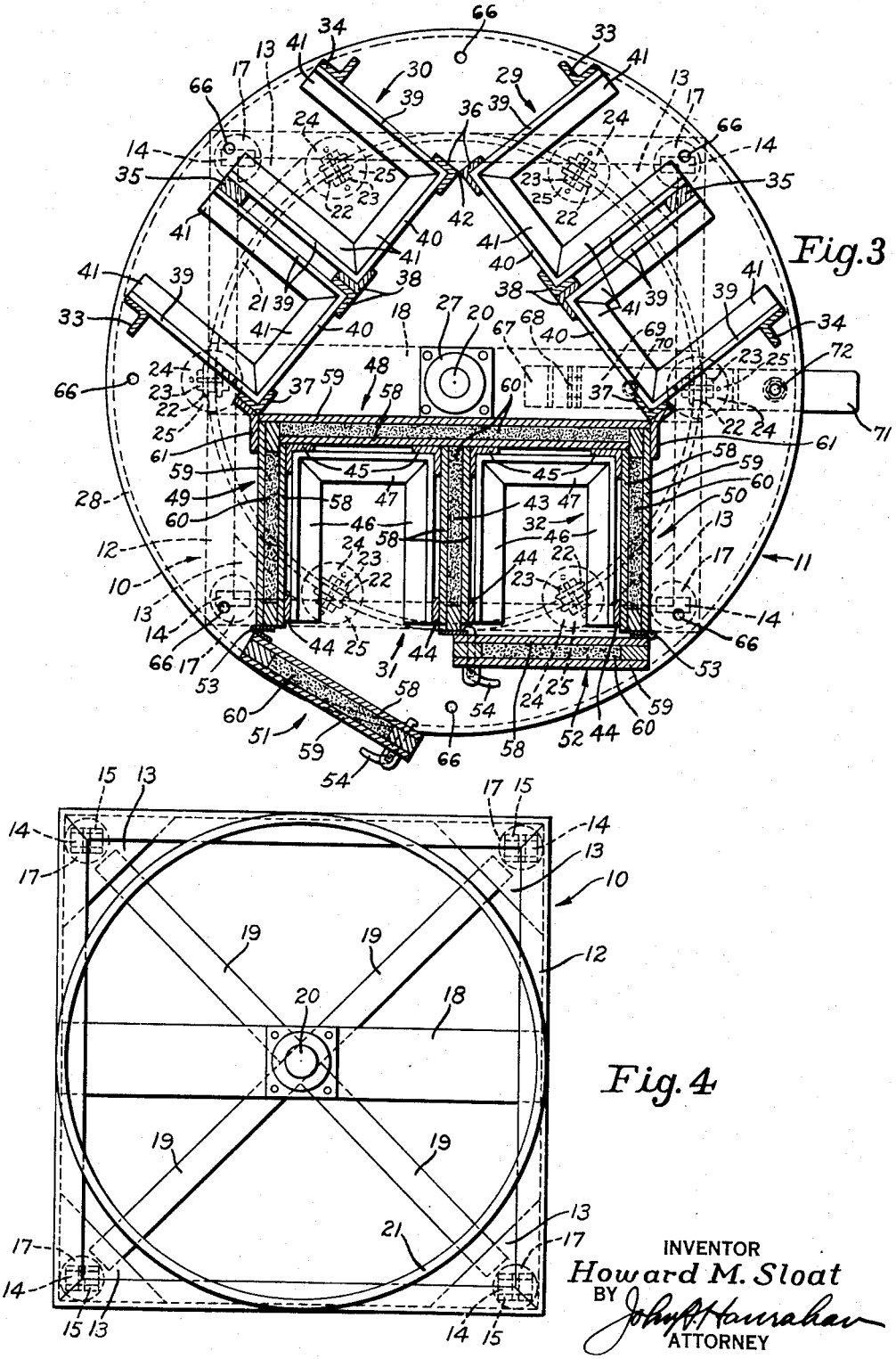
INVENTOR
Howard M. Sloat
BY
ATTORNEY Patented Mar. 21, 1944

2,344,650

UNITED STATES PATENT OFFICE 2,344,650

LOADING APPARATUS

Howard M. Sloat, Fairfield, Conn.

Application November 5, 1942, Serial No. 464,675

4 Claims. (Cl. 211—139)

This invention relates to new and useful improvements in loading apparatus and has particular relation to a means for facilitating the loading of delivery trucks and the like.

The invention provides means whereby the load of a delivery vehicle, as, for example, a milk truck, may be assembled in the absence of the vehicle and then simply pushed onto the vehicle when the latter is brought to a loading platform or the like.

In addition the invention provides means whereby any part of a full vehicle load is readily accessible to the operator without the necessity of shifting individual bottle cases or the like and in fact without the necessity for the operator to do any lifting of any part of the load.

Other features of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 1 is an elevational view of the loading apparatus of the invention a portion being broken away to show a detail of construction;

Fig. 2 is a somewhat similar view but of the lower portion only of the apparatus and within a vehicle body;

Fig. 3 is a horizontal sectional view through the loading apparatus of the invention; and Fig. 4 is a top plan view of the dolly employed.

The present invention comprises certain improvements in the invention of my prior Patent Number 2,238,233, issued April 15, 1941.

Referring in detail to the drawings the loading apparatus of the invention as here shown comprises a dolly generally designated 10 and a load carrying platform generally designated 11 arranged for turning movement on the dolly. Dolly 10 comprises a substantially square frame 12 of angle iron or other suitable structural elements. The corners of frame 12 are braced by gusset plates 13.

Rollers 14 are swivelly connected with the frame 12 to support the same for easy rolling movements. The rollers per se are mounted by brackets 15 including pins or projections 16 pivotally received in blocks 17 fast to the dolly frame at the corners thereof. A plate 18 extends transversely of the dolly between a pair of sides thereof and in addition straps 19 extend diagonally of the frame from corner to corner thereof. These straps are welded or otherwise secured to the gusset plates 13 and cross one another and the plate 18 substantially midway the ends of the latter.

A bearing means in the form of a stud 20 is mounted by the plate 18 at its braced mid-portion and projects vertically therefrom. Bearing means 20 is concentric with an annular track 21 comprising a vertical flange disposed on the upper side of the dolly frame 12 and welded or otherwise fixed thereto. It is noted that the track 21 is of substantially a diameter equal to the width of the frame 12 whereby such track does not project beyond the frame and is solidly mounted.

Supporting the platform 11 from the track 21 are a number of grooved or flanged rollers 22. These rollers straddle the upper edge of the track or receive such edge in their grooves. Each roller is mounted by a bracket 23 including a plate portion 24 working against a plate 25 welded or otherwise secured to the under side of the platform 11. Extending from each bracket plate 24 is a pin or projection 26 pivotally received in an opening or socket provided for that purpose in one of the plates 25.

In this way the grooved rollers 22 are swivelly mounted on the under side of the platform 11 and riding on the track 21 mount the platform for easy turning movement relative to the dolly 10. It is further noted that the bearing means 20 enters a bearing 27 on the central portion of the platform 11 whereby the latter turns with bearing member 20 as a center and is guided by the latter as well as by the grooved rollers receiving the upper edge of the track.

Platform 11 is preferably of sheet metal and to stiffen it and avoid the use of heavy gauge metal the edge portion of the platform is bent downwardly into an annular flange 28. On the upper side of the platform 11 are load receiving racks 29, 30, 31 and 32. The racks are arranged with their centers one hundred and twenty degrees apart and with their open sides facing outwardly or toward the peripheral edge of the platform.

Racks 29 and 30 are of identical construction and each comprises outside front posts 33 and 34 and an inside front post 35 and corresponding rear posts 36, 37 and 38 respectively. The outside posts comprise angle irons and the front inside post comprises a strap-like piece while the inside rear post comprises a pair of angle iron members. Each rack 29 and 30 is in effect a double rack or two racks and their posts support other angle iron members including side members 39 and rear members 40 each arranged with one angle flange projecting inwardly whereby to form shelf-like structures disposed one above the other.

These shelves are so spaced vertically that a milk case or the like may be slid on one shelf without interference from another shelf or from a milk case or the like on such other shelf. The lower flanges 41 of the side and rear angle iron members making the shelves are preferably relatively wide whereby to support milk cases or the like of somewhat varying widths.

Attention is directed to the fact that the shelves are inclined in a manner to tilt or incline their loads toward the inner ends of the racks or toward the center of the platform. With this structure the outer ends of the shelves are left open as there is little likelihood of a milk case or the like being accidentally thrown from a shelf. Adjacent rear corner posts of the racks 29 and 30 may be welded together as at 42 (see Fig. 3) to strengthen and brace the entire structure.

Racks 31 and 32 are really parts of a double rack structure but are separated by a heat insulating wall 43. Each of racks 31 and 32 comprises spaced front corner posts 44 and spaced rear corner posts 45 and these support shelf-like structures made up of side and rear angle iron members 46 and 47 respectively. The mentioned shelves are arranged one above the other in the same spaced relation as the shelves of racks 29 and 30.

In the racks 31 and 32 the shelves are inclined as and for the purpose set forth when considering racks 29 and 30. Here it is noted that the angle iron members forming the shelves of the various racks are secured to the vertical rack posts in any desired manner but preferably as by welding or the like to make a permanent and rigid structure.

An insulating wall 48 closes the rear sides of the racks 31 and 32 and at the outer sides of the respective racks are insulating walls 49 and 50 while the front sides of the respective racks may be closed by insulating doors 51 and 52. Doors 51 and 52 are mounted as on piano hinge structures 53 and each is equipped with a latch means 54 for securing it in closed position. At the upper end of each rack 31 and 32 (and within the insulating housing) is a small compartment having a shelf 55 adapted for the reception of a refrigerant, as cracked ice or the like, preferably held in a suitable vessel (not shown). It is here noted that above the shelves 55 the racks 31 and 32 are closed by a top insulating wall 57.

As here shown the insulating structure about the racks 31 and 32 comprises inner and outer spaced elements 58 and 59, preferably ply-boards, having between them a suitable insulating fibre 60. With this construction the milk or the like in the racks 31 and 32 may be kept cold while the milk or the like in the racks 29 and 30 is being delivered. That is, on his route the milk-man will first distribute the contents of the racks 29 and 30 and thereafter, on the latter part of his route, will distribute the milk from racks 31 and 32. However, it is to be understood that it is within the conception of the invention to have all the racks on platform 11 insulated if that is desired. The various racks brace one another and to this end in addition to the racks 29 and 30 being welded or otherwise connected at 42, the said racks are connected with the insulating housing of the racks 31 and 32 at vertically spaced points as by the brackets 61.

In the structure disclosed the racks provided are capable of holding thirty cases of milk, five shelves being provided in each single rack. The entire loading device of the invention is designed to be loaded in a refrigerator or the like and then pushed onto a loading platform and thence into a delivery truck or the like.

A portion of such a vehicle is shown at 62 in Fig. 2 and the same includes a floor 63, side walls 64 and wheel housings 65 extending into the body above the floor thereof. The dolly 10 is of such size as to fit into the body 62 between the wheel housings 65. While the platform 11 is of considerably greater diameter than the dolly (in order to support the desired number of and sizes of racks) it is noted in Fig. 2 that the platform being supported by the dolly structure and the rollers 22 and their mountings the platform is located above the wheel housings and passes freely between the side walls of the vehicle body.

Means are provided for locking the platform 11 against any casual turning movement on the dolly. To this end the platform is provided with spaced holes or openings 66, six such openings being shown. Mounted on the dolly is a bracket 67 to which a hinge 68 connects one end of a lever 69. The lever is mounted on plate 18 at the under side of the dolly and a coil spring 70 constantly tends to move the lever toward the dolly frame and to keep it against the latter. Preferably the lever 69 is bent to provide a portion 71 extending under and projecting beyond an edge of the platform and such portion 71 carries a bolt 72 adapted to enter any one of the openings 66 in the platform.

When access to any rack on the platform 11 is desired the operator depresses the lever 69 to withdraw the bolt 72 from an opening 66 in the platform and then the latter is rotated to bring the desired rack into alignment with a rear, side or front door of the vehicle body. Preferably the platform is turned sufficiently to bring one of the openings 66 into alignment with the bolt 72 whereupon the spring 70 will move the lever upwardly and shift the bolt into such opening locking the platform in the chosen position. With the described construction each milk case is on a shelf independent of the other milk cases in the same rack so that the operator may readily obtain access to the contents of any case of his load without having to handle any other case.

The entire device when loaded may be easily pushed into a truck or the like and at the end of his route or on his return to a milk station, bakery, laundry or the like, the driver, or someone else, may easily and quickly push the device from the truck. This is an advantage where loading facilities provide only for one truck at the loading platform at any one time.

While on his route the driver easily obtains access to any part of his load. He does not have to lift one case from another or shift any part of his load off any other part. Nor is it necessary that the load be arranged in any particular order in the vehicle since all parts are substantially equally accessible. Owing to the use of the track and the grooved rollers the entire platform is easily turned relative to the dolly. Rollers 22 being swivelly mounted will not bind on the track but move freely on the same whereby the entire load may be revolved with a minimum of effort to give access to any part.

Having thus set forth the nature of my invention, what I claim is:

1. In a loading device, a dolly comprising a rectangular frame, gusset plates connecting the inner corners of said frame, supporting rollers at the under side of said frame, a plate extending across said frame from side to side thereof, straps connected at their opposite ends with said gusset plates and extending diagonally of said frame and bracing said plate substantially midway the ends thereof, a circular track on the upper side of said frame, a bearing means secured to and extending upwardly from the braced portion of said plate in concentric relation with said track, a platform at the upper side of said track, rollers carried by said platform and bearing on said track and from the latter supporting the platform, and said platform concentric with and turnable about said bearing means as a center.

2. In a loading device, a dolly, a load carrying platform at the upper side of said dolly, load receiving racks on the upper side of said platform, means mounting said platform for turning movement relative to said dolly, said platform being of greater diameter than said dolly and extending beyond all sides of the latter, said platform having spaced bolt receiving openings therethrough in its portions beyond the side edges of the dolly, a lever pivoted to the dolly and extending beyond the outer peripheral edge of the platform, a spring normally tending to move said lever toward said platform, and a bolt carried by said lever and adapted to enter one of said openings in the platform and lock the latter against movement relative to the dolly.

3. In a loading device, a dolly, a platform on the upper side of said dolly for movement therewith, means mounting said platform for turning movement on the dolly, load supporting double racks fixed on the upper side of said platform, each of said racks comprising three spaced front uprights disposed toward the outer edge of said platform and three spaced rear uprights inwardly toward the center of the platform from said front uprights, said uprights arranged to provide mid and outer front and rear uprights, shelves comprising U-shaped members of angle iron at each side of the mid, front, and rear uprights and supported by the latter and the outer front and rear uprights, said U-shaped members arranged with the free end portions of their side arms connected with the front uprights and having their rear portions connected with the rear uprights, and said U-shaped members arranged with the free end portions of their side arms vertically above their connecting portions whereby said shelves incline to cant their loads toward the center of the platform.

4. In a loading device, a dolly, a platform on the upper side of said dolly for movement therewith, means mounting said platform for turning movement on the dolly, load supporting double racks fixed on the upper side of said platform, each of said racks comprising three spaced front uprights disposed toward the outer edge of said platform and three spaced rear uprights inwardly the center of the platform from said front uprights, said uprights arranged to provide mid and outer front and rear uprights, shelves comprising U-shaped members of angle iron at each side of the mid front and rear uprights and supported by the latter and the outer front and rear uprights, and said U-shaped members arranged with the free end portions of their side arms connected with the front uprights and having their rear portions connected with the rear uprights.

HOWARD M. SLOAT.